(12) United States Patent
Walsh et al.

(10) Patent No.: US 7,701,558 B2
(45) Date of Patent: Apr. 20, 2010

(54) LIDAR SYSTEM

(75) Inventors: Gregory C. Walsh, Walnut Creek, CA (US); Alan Aindow, Alameda, CA (US)

(73) Assignee: Leica Geosystems AG, Heerbrugg (CH)

( * ) Notice: Subject to any disclaimer, the term of this patent is extended or adjusted under 35 U.S.C. 154(b) by 321 days.

(21) Appl. No.: 11/903,302

(22) Filed: Sep. 21, 2007

(65) Prior Publication Data

US 2008/0074640 A1    Mar. 27, 2008

Related U.S. Application Data

(60) Provisional application No. 60/846,617, filed on Sep. 22, 2006.

(51) Int. Cl.
*G01C 3/08* (2006.01)
(52) U.S. Cl. ............... 356/5.01; 356/4.01; 356/4.1; 356/5.1; 356/5.15
(58) Field of Classification Search ........ 356/3.01–28.5
See application file for complete search history.

(56) References Cited

U.S. PATENT DOCUMENTS

| | | | |
|---|---|---|---|
| 5,177,556 A | 1/1993 | Rioux | 356/73 |
| 5,946,645 A | 8/1999 | Rioux et al. | 702/155 |
| 5,988,862 A | 11/1999 | Kacyra et al. | 364/578 |
| 6,009,359 A | 12/1999 | El-Hakim et al. | 701/28 |
| 7,508,524 B2 * | 3/2009 | Mahadevan-Jansen et al. | 356/479 |
| 2004/0260183 A1 * | 12/2004 | Lambert et al. | 600/476 |

OTHER PUBLICATIONS

S.C. Buchter et al., "Advances Lead to Miniature Supercontinuum Sources," *Photonics Technology World*, Oct. 2004 Edition, 3 pages in length.

* cited by examiner

*Primary Examiner*—Thomas H Tarcza
*Assistant Examiner*—Luke D Ratcliffe
(74) *Attorney, Agent, or Firm*—Workman Nydegger

(57) ABSTRACT

Methods for using spectrally separated light pulses to collect more LIDAR information are presented. In one embodiment, a monochromatic pulse is transmitted to collect range information and a white pulse is transmitted a short time afterwards to collect spectral responsivity information or color of the target. In another embodiment, the white light pulse is used to collect both range and spectral responsivity information of the target. In another embodiment, the spectral separated laser is spatially spread in order to collect range information over more than one point at a time.

7 Claims, 5 Drawing Sheets

MULTIPLEXED LIDAR
Version 2

LIDAR SYSTEM

PRIORITY CLAIM

This application claims the benefit of U.S. Provisional Application No. 60/846,617, filed on Sep. 22, 2006, by Gregory C. Walsh and titled "Full Color LIDAR System." Provisional Application No. 60/846,617 is hereby incorporated by reference herein in its entirety.

BACKGROUND OF THE INVENTION

The acquisition of data and subsequent generation of computer models for real-world objects is of interest in many industries and for many applications including architecture, physical plant design, entertainment applications (e.g., in movies and games), surveying, manufacturing quality control, medical imaging, and construction, as well as in cartography and geography applications. In order to obtain accurate 3D models of an object, as well as the area in which that object exists in the real world, it is necessary to take accurate measurements or samplings of surfaces that make up the object and any elements of the surrounding area. Historically, this sampling was carried out using techniques that provided samples at the rate of tens or hundreds per hour at most.

Recent advances in scanning technology, such as technologies utilizing LIDAR scanning, have resulted in the ability to collect billions of point samples on physical surfaces, over large areas, in a matter of hours. In a LIDAR scanning process, the scanning device scans a laser beam across a scene that encompasses the structure of interest and the beam reflected from the scene is captured by the scanning device. The scanning device thus measures a large number of points that lie on surfaces visible in the scene. Each scan point has a measured location in 3D space, to within some measurement error, that typically is recorded relative to a point (x,y,z) in the local coordinate system of the scanner. The resulting collection of points is typically referred to as one or more point clouds, where each point cloud can include points that lie on many different surfaces in the scanned view. LIDAR systems are described, for example, in U.S. Pat. No. 5,988,862, issued on Nov. 3, 1999, titled "Integrated System for Quickly and Accurately Imaging and Modeling Three Dimensional Objects," which is hereby incorporated herein by reference in its entirety to provide background information regarding the present invention.

FIG. 1 shows an exemplary LIDAR scanning system 100. Scanning system 100 utilizes a field digital vision (FDV) module 102 that includes a scanning device for scanning a target object 104, such as a building or a piece of machinery. The scanning device senses the position in three-dimensional space of selected points on the surface of the object 104. Based upon the light reflected back by the surface of the object 104, the FDV module 102 generates a point cloud 106 that represents the detected positions of the selected points. The point cloud 106 can also represent other attributes of the detected positions, such as reflectivity, surface color, and texture, where desired.

A control and processing station 108 interacts with the FDV 102 to provide control and targeting functions for the scanning sensor. In addition, the processing and control station 108 can utilize software to analyze groups of points in the point cloud 106 to generate a model of the object of interest 104 that is stored in a database 118. A user interface 116 allows a user to interact with the system 100, such as to view a two-dimensional (2D) representation of the three-dimensional (3D) point cloud 106, or to select a portion of the target object 104 to be viewed in higher detail. The processing and control station 108 can include any appropriate components, such as standard computer and/or processing components. The processing and control station 108 can also have computer code in resident memory, on a local hard drive or in a removable drive or other memory device, which can be programmed to the processing station 108 or obtained from a computer program product such as a CD-ROM or download signal. The computer code can include instructions for interacting with the FDV 102 and/or a user, and can include instructions for undertaking and completing any modeling and/or scanning process discussed, described, or suggested herein.

The FDV 102 can include an optical transceiver, shown in FIG. 1 as a LIDAR scanner 110, that is capable of scanning points of the target object 104, and that generates a data signal that precisely represents the position in 3D space of each scanned point. The data signals for the groups of scanned points can collectively constitute the point cloud 106. In addition, a video system 112 can be provided, which in one embodiment includes both wide angle and narrow angle CCD cameras. The wide angle CCD camera can acquire a video image of the object 104 and provides to the control and processing station 108, through a control/interface (C/I) module 114, a signal that represents the acquired video image. The acquired video image can be displayed to a user through the user interface 116 of the processing and control station 108. Through the user interface 116, the user can select a portion of the image containing an object to be scanned. In response to user input, the processing and control station 108 can provide a scanning control signal 120 to the optical transceiver 110 for controlling the portion of the surface of the object 104 that should be scanned by the transceiver 110.

The narrow angle CCD camera of the video system 112 can capture the intensity of light returned from each scan impingement point, along with any desired texture and color information, and can provide this captured information to the processing and control station 108. The processing and control station 108 can include a data processing system (e.g., a notebook computer or a graphics workstation) having special purpose software that, when executed, instructs the data processing system to perform the FDV 102 control and targeting functions, and also to perform the model generation functions discussed elsewhere herein. Once the object 104 has been scanned and the data transferred to the database 118, the data and/or instructions relating to the data can be displayed to the user.

Conventional LIDAR scanning systems, such as the Leica HDS3000 system and the Leica HDS4500 system, are monochromatic. That is, they generate distance information based upon time-related measurements of the output from a single wavelength laser. If any color information on the scanned object or scene is required, it is typically obtained using a second conventional, non-time resolved camera, as discussed above with respect to the FIG. 1 system 100. The auxiliary camera may be mounted in parallel (alongside, laterally displaced) with the LIDAR system or coaxially by the use of either a beam-splitter or a separate moving mirror to intermittently intercept the LIDAR optical path. The two sets of data images, the LIDAR data and conventional camera data, may further be combined using so-called "texture mapping" in which the non-time resolved color information obtained from the conventional camera data is superimposed upon the LIDAR data using dedicated software, so as to produce a pseudo "color LIDAR" image.

This approach to "color LIDAR" can enhance the perception of the scanned object or scene, but suffers from a number of disadvantages. As discussed above, a second camera is required, adding to system complexity and costs, and requiring additional system (camera-to-LIDAR) alignments and calibrations. The parallel systems also result in registration errors (physical and software) and possible parallax errors, and often operate on the basis of different color and LIDAR resolutions (pixel sizes, spot sizes). In brief, the result is a dual optical system that is not only complex, but also suffers from generally imperfect registration and mismatched optical resolutions.

DETAILED DESCRIPTION OF THE INVENTION

Figure 1:
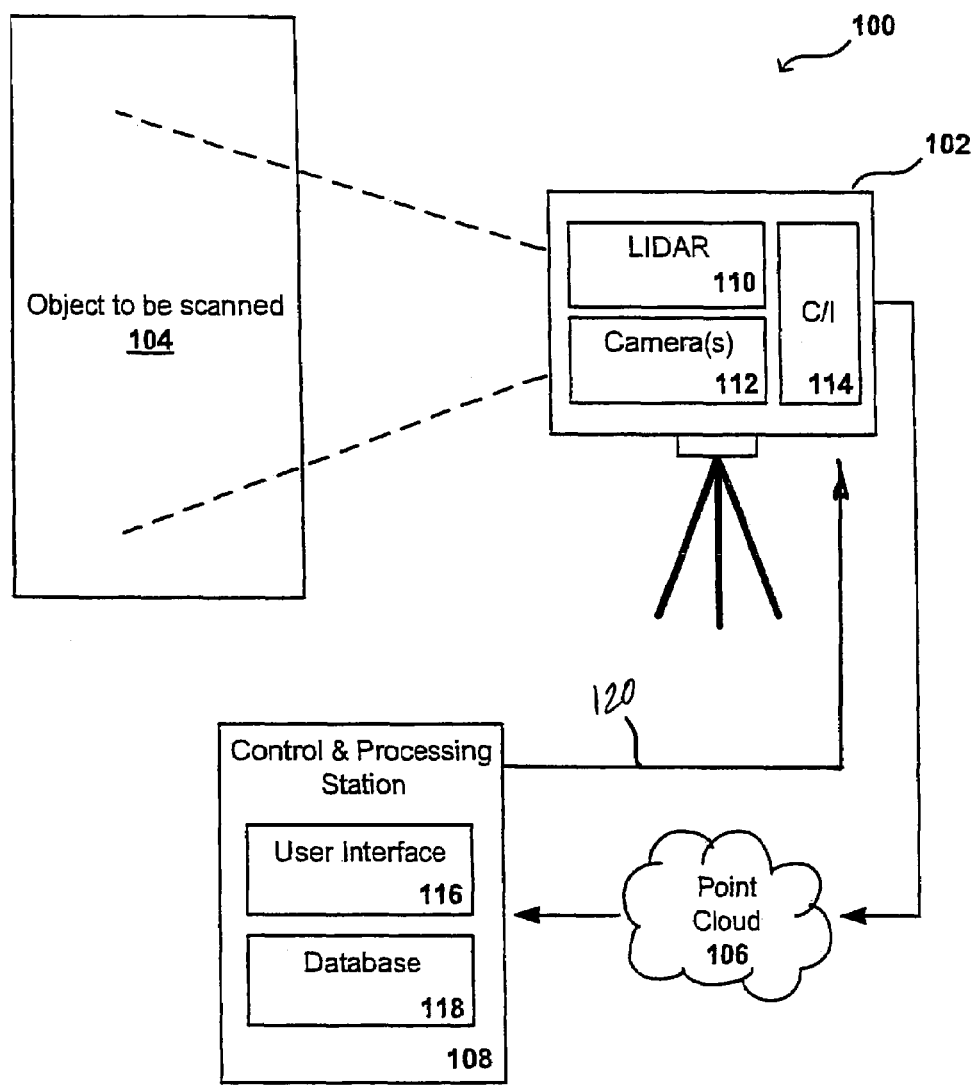
FIG. 1 is a block diagram illustrating a scanning system that can be used in accordance with one embodiment of the present invention.
Figure 2:
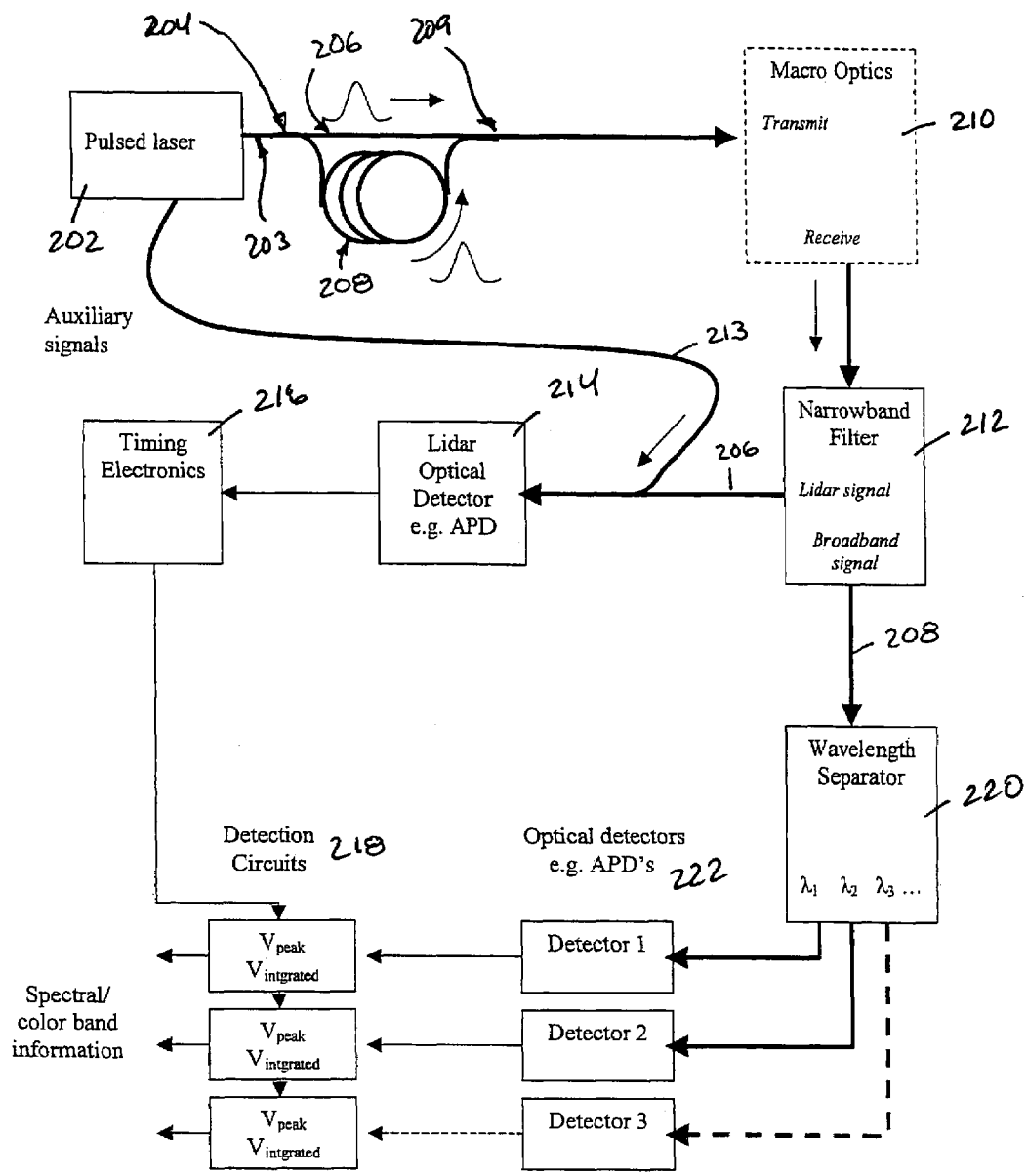
FIG. 2 is a block diagram illustrating an embodiment of a full color LIDAR system in accordance with the present invention.

FIG. 2 shows an embodiment of a full color LIDAR system 200 in accordance with the present invention.

In the FIG. 2 system 200, a pulsed laser 202 provides a laser pulse that is propagated down an optical path, preferably a single mode optical path 203, and divided by a 2× fiber optic splitter 204 into two paths. The first path 206, a direct monochromatic "LIDAR" laser pulse, is coupled directly to transmitter macro-optics 210, e.g. beam collimation optics. The second path 208, the "illumination" path, is split off and delayed through a comparatively long non-linear fiber that wavelength-broadens the output to form a super-continuum or delayed wavelength-broadened "white" illumination laser pulse. The first LIDAR optical path 206 and the second illumination optical path 208 are recombined by a second fiber optic coupler-splitter 209 and launched out of a common fiber exit of the coupler-splitter 209 towards the macro-optics 210. The monochromatic LIDAR pulse 206 forms the basis for the timing/distance measurements made by the system 200; the delayed wavelength-broadened "white" illumination laser pulse 208 provides the basis for the spectral/color measurements made by the system 200. Generation of the supercontinuum or "white" light pulse 208 is in accordance with techniques well known to those skilled in the art using readily available off-the-shelf products. Typically, a Q-switched 532 nm microchip laser is propagated down non-linear fibers, e.g. photonic crystal fibers.

The system 200 scans the combined direct monochromatic LIDAR pulse 206 and delayed wavelength-broadened "white" illumination pulse 208 across a target object and receives a return light signal in the well known manner discussed above.

With continuing reference to FIG. 2, upon receipt of the return light signal through the receiver macro-optics 210, the monochromatic LIDAR laser pulse 206 is split off by a narrow-band filter 212, combined with auxiliary signals 213, which are used to determine the start of the laser firing as well as calibration optical pulses, and directed toward a high-speed LIDAR detector 214, typically an avalanche photo diode (APD), for processing in the conventional manner. The output of the optical detector 214 is provided to timing electronics 216 and then to detection circuits 218. That is, the monochromatic LIDAR pulse 206 arrives at the LIDAR optical detector 214 well before the white illumination pulse arrives at the detection circuits 218. Thus, the timing electronics 216 can detect the monochromatic LIDAR pulse arrival and set the integration window for the detection circuits 218. The monochromatic LIDAR pulse 206 is used in the conventional manner to determine the range; the white illumination pulse 208 is used to determine the spectral reflectivity as follows.

As further shown in FIG. 2, the remaining, substantially intact, broadband "white illumination" pulse 208 that has traveled from the receiver side of the macro-optics 210 and though the narrow-band filter 212 is further spectrally divided by a wavelength separator 220 into a number of spectral color components $\lambda_1, \lambda_2, \lambda_3 \ldots$. Each of the spectral color components $\lambda_1, \lambda_2, \lambda_3 \ldots$ is then propagated down a separate route to a corresponding "color" detector1, detector 2, detector3 . . ., respectively, e.g. APDs, each of which is, in turn, coupled to a corresponding intensity-related measuring/detection circuit 218. As mentioned above, the detection circuits 218 are triggered by the timing electronics 216. Since the monochromatic pulse 206 arrives before the white illumination laser pulse 208, the stop signal generated by the timing electronics 216 can be used to set the integration window for the detection circuits 218. The time interval between the monochromatic return pulse 206 and the white illumination pulse 208 is fixed by the difference in fiber lengths in the two transmit paths.

The narrow-band filter 212 and wavelength separation may be achieved using a combination of conventional optics, e.g. beam-splitters and lenses. Alternately, and preferably, the optical system, aside from the transmitter and receiver macro-optics 210, is composed entirely of optical fibers and optical fiber components and devices well known to those skilled in the art.

Regardless of the mechanism utilized, the LIDAR information and the color information are extracted simultaneously from the same original laser pulse. Furthermore, the LIDAR pulses 206 and the illumination pulses 208 are launched out of the same, preferably single-mode, optical fiber 203 and, hence, have perfectly overlapping beam patterns or profiles.

The full color LIDAR system 200 utilizes a single laser source and provides multicolor/spectral resolution. It requires no separate conventional camera or alternative optical path in the out-going optical path and eliminates registration errors and spot or pixel size mismatches between the return LIDAR and color information. In short, the full color LIDAR system 200 is simplified over the conventional systems and registration is near perfect.

As a variation on the system 200 shown in FIG. 2, a separate, second "illumination" source is coupled to the LIDAR laser beam fiber by a fiber-optic coupler-splitter, i.e. sharing the essential common exit and launch into the transmitter macro-optics 210. Suitable illumination light sources include a combination of different wavelength (pulsed) laser diodes and super-bright white light emitting diodes (LEDs). To ensure registration, the illumination path is triggered within a short period of time of the LIDAR pulse, typically a microsecond, so as to effectively freeze the target scan motion. In this respect, the illumination source can be comparatively slow (microseconds rather than 100 s picoseconds) to the advantage of not adding significantly to the (combined) accessible emission limit (AEL) and system laser classification.

Figure 3:
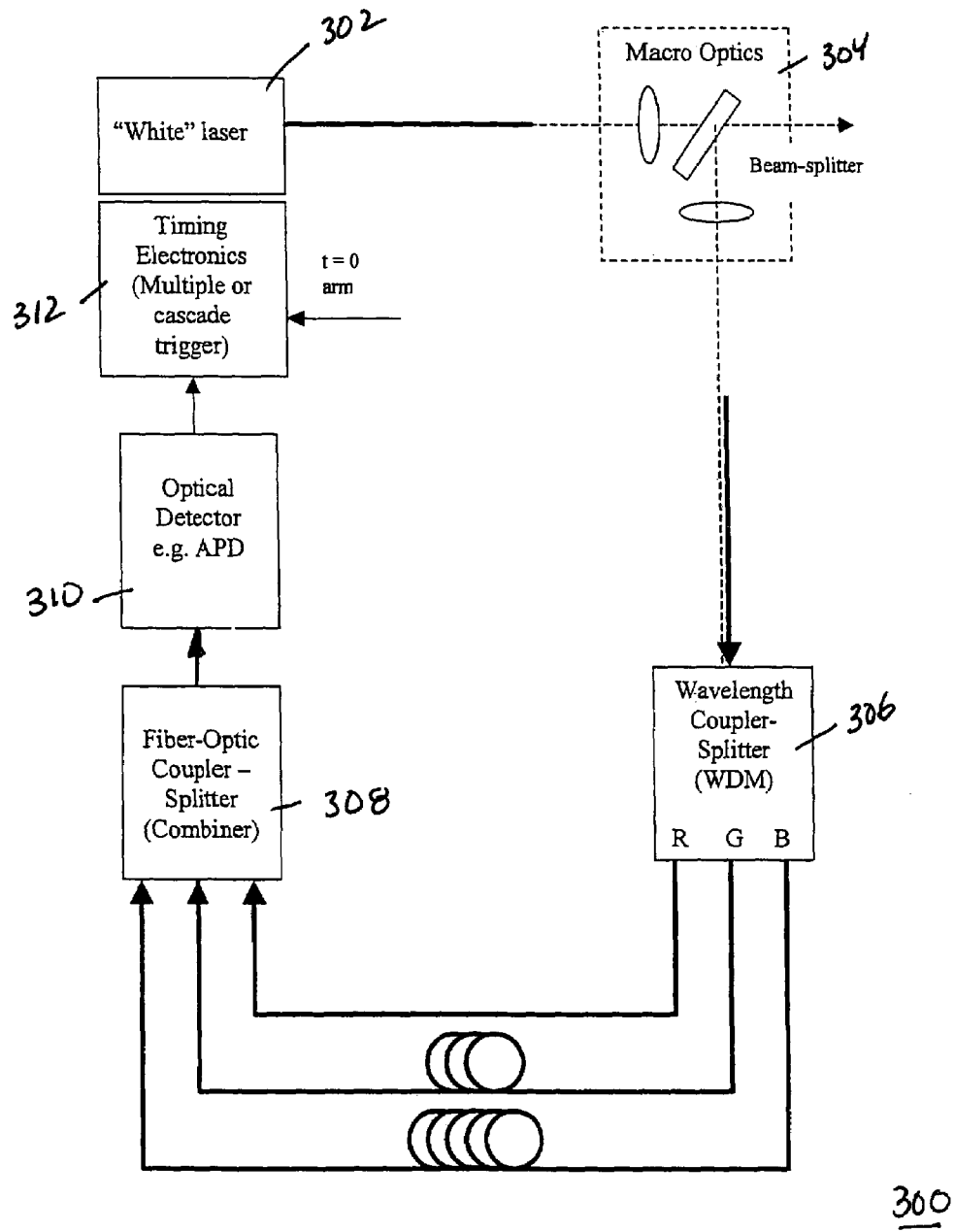
FIG. 3 is a block diagram illustrating an alternate embodiment of a full color LIDAR system in accordance with the present invention.

FIG. 3 shows an alternate embodiment of a full color LIDAR system 300 in accordance with the present invention.

The full color LIDAR system 300 uses a "white" laser 302 as discussed above with respect to the FIG. 2 system 200. However, as shown in FIG. 3, upon return at the receiver macro-optics 304, the color components are wavelength separated by wavelength coupler-splitter (WDM) 306 into multiple color (e.g. Red (R), Green (G), Blue (B)) components, each of which is propagated down a separate fiber optic delay line R, G, B of different length. This produces a plurality of time-separated or time-resolved wavelength-separated "color" pulse components. The time-resolved color pulse components are then recombined, preferably using a fiber-optic coupler-splitter (combiner) 308, for detection at a common detector 310, e.g. an ADP. By synchronization with multi-trigger timing electronics 312 and associated pulse intensity measurement circuitry (not shown), all of the spectral/color components can be detected and their arrival time, corrected from knowledge of the individual lengths of the fiber delay lines, recorded together with their relative intensity (image color).

In the FIG. 3 system 300, a single laser and a single detector are utilized in a system that maintains spectral/color resolution. As in the FIG. 2 system 200, there is no separate conventional camera or alternative optical path in the out-going optical paths and no registration errors or spot or pixel size mismatches between return color and LIDAR information. Absolute scanner LIDAR accuracy is maintained for each of the multiple color components.

In the latter respect, individual detectors, for example, could be used for each spectral/color component, but the result would be inevitable timing errors between the devices due to varying performances, which though small, can be significant in high accuracy LIDAR systems.

In each of the FIG. 2 and FIG. 3 full color LIDAR systems, the LIDAR and color or illumination beams are either one and the same, or co-propagate down the same exit fiber. Hence, they remain fully registered in the scanned scene or target. This provides fully registered LIDAR and color scan images and without a discrete auxiliary (non time-resolved) camera. The spectral/color and LIDAR information is obtained using various combinations of wavelength-division and time-division, preferably based upon fiber optics and fiber optics components and devices. The outgoing laser beam can be periodically directed at an internal target for LIDAR timing calibration and color calibration. In this way, various return LIDAR signals can be corrected for timing drifts or differences and the laser/detective spectrum normalized for final color rendition. Scanning can be performed not only in true (visible) RGB color, but also in spectroscopically-sensitive mode. In this latter context, fiber optic devices are available with wavelength splitting resolutions down to 0.1 nm, which is usefully narrow for atomic/molecular spectroscopy. Thus, the LIDAR return from the "white light" laser output may be analyzed spectroscopically. As discussed above, in one scheme, return LIDAR light is divided into three narrow band wavelengths: a mid wavelength centered on a chosen absorption line, plus two close side points as absorption intensity references. In this way, LIDAR measurements may be combined and performed simultaneously with differential spectroscopy. Applications include mining and mapping of pollutants/hazardous chemicals.

Presently, effort is being made to integrate individual LIDAR device elements into arrays, so as to produce a "LIDAR camera", analogous to conventional camera CCD or CMOS arrays.

Figure 4:
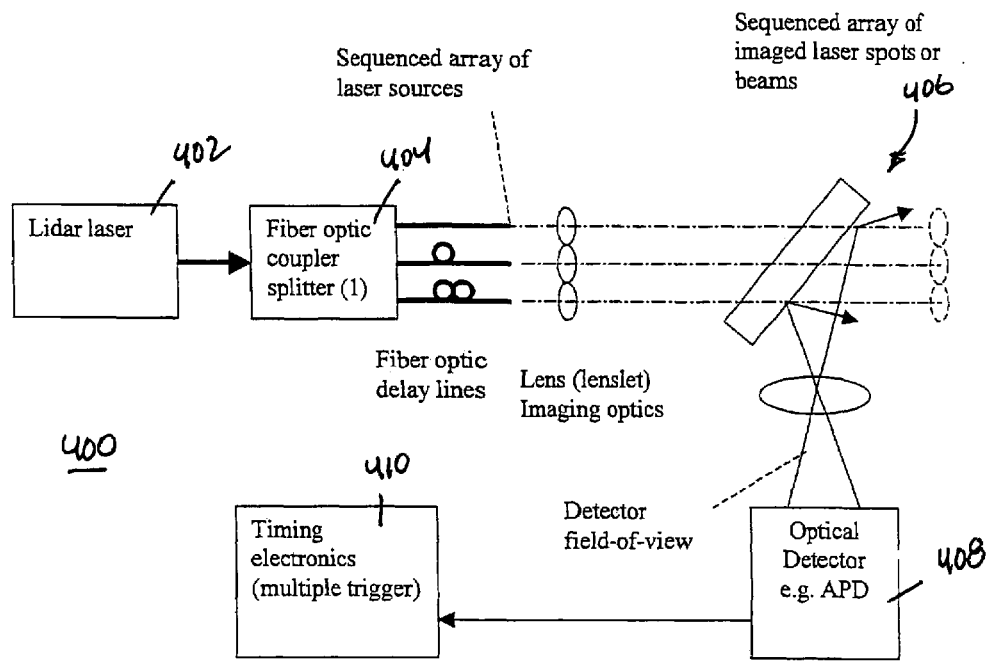
FIG. 4 is a block diagram illustrating another alternate embodiment of a LIDAR system in accordance with the present invention.

With reference to FIG. 4, an embodiment of the present invention provides a system 400 that utilizes fiber optics technology to produce a time-division (time multiplexed) or a wavelength-division (wavelength multiplexed) "LIDAR array" without need of multiple lasers or detectors.

In the FIG. 4 system 400, the output from a pulsed LIDAR laser 402 is split into multiple paths using a fiber optic coupler-splitter 404 and delay lines of varying length, and imaged as a time-lapse array of spots in the scan field.

The detector's field-of-view encompasses the entire laser output, all the laser spots being detected. The laser spots are time-separated or resolved with set (known) delays using the fiber optic delay lines. Upon detection, each individual laser spot can be resolved and detected in sequence using a single optical detector 408 and multiple trigger timing electronics 410. In brief, the laser spots are spatially-differentiated and then time-multiplexed.

The laser imaging optics 406 may be a linear series of lenses or a 2D array of lenses or lenslets, depending on whether the spot array is to be linear or 2D, respectively.

Figure 5:
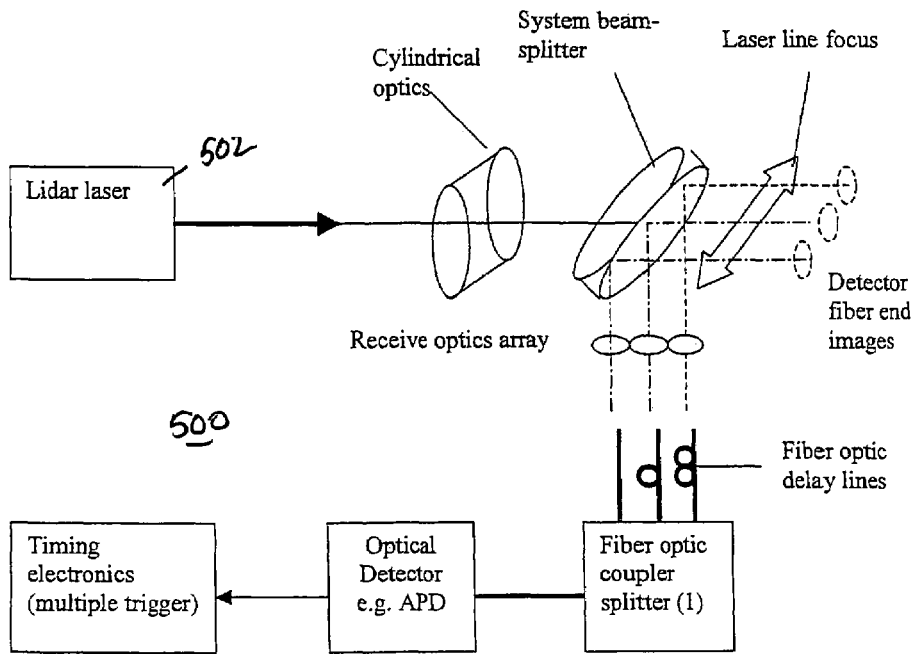
FIG. 5 is a block diagram illustrating another alternate embodiment of a LIDAR system in accordance with the present invention.

FIG. 5 shows an alternate embodiment of a multiplexed full color LIDAR system 500 in accordance with the present invention. The FIG. 5 system uses a LIDAR laser source 502 and multiplexes the receiver path, shown in FIG. 5 in linear array form.

In the case of both FIG. 4 system and FIG. 5 system, which utilize spatially separated/time-staggered laser spots or detector images, LIDAR measurements can be made in arrays using a single-shot laser and a single detector. In either case, cylindrical optics can be used to produce linear arrays, and spherical optics can be used for the 2D array. In both cases time, by the way of fiber optic delay lines, is used to separate the LIDAR channels. Given a white laser, however, and the wavelength separation optics described above, wavelength can also be used to separate the channels, as shown in the FIG. 6 embodiment of a multiplexed full color LIDAR system in accordance with the invention.

Figure 6:
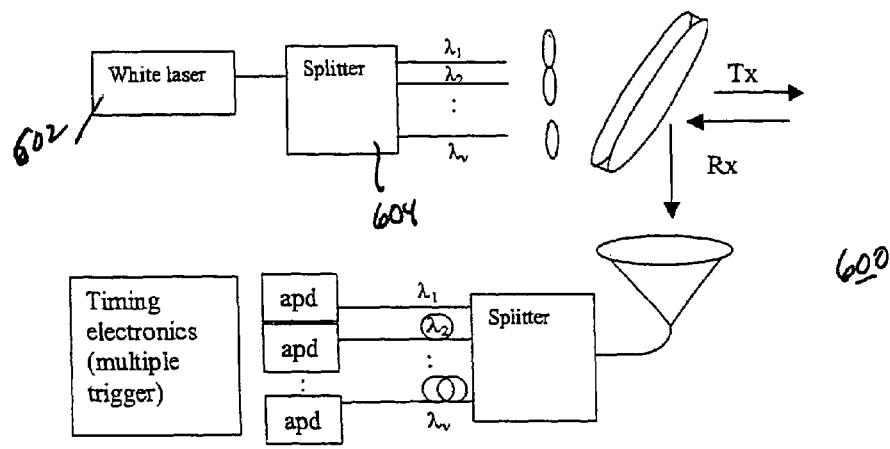
FIG. 6 is a block diagram illustrating another alternate embodiment of a LIDAR system in accordance with the present invention.

In the FIG. 6 system, the laser pulse from the white laser source 602 is separated by wavelength by a splitter 604. Separate portions of the spectrum are simultaneously transmitted to the target object at different angular directions. The receive channel Rx then separates the reflected wavelength separated signals either into separate detector channels and provides them to a multiple input channel timing circuit, or, as shown in FIG. 6, time multiplexes each channel using optical delay lines into a single input, multiple trigger timing electronics.

There are two important advantages to the FIG. 6 scheme. First, the data generation rate is multiplied up, being equal to the laser repetition rate times the number of array elements. Second, laser beam area can be extended over an area or dimension considerably wider than the nominal 7 mm dilated eye pupil diameter.

In the FIG. 4 embodiment, any upper laser firing frequency limit, typically 60 kHz in Nd:YAG microchip lasers due to Q-switch recovery times, does not limit the LIDAR data collection rate. Thus, for a 2×2 array, a nominally 60 kHz LIDAR system will collect data at 4×60 kHz=240 kHz rate.

In the second instance, much greater laser output pulse energies can be emitted while remaining with the Accessible Emission Limit (Laser Classification) for a given LIDAR system.

In the third instance, the ambiguity associated with determining which LIDAR channel is resolved by wavelength, not time. Using wavelength to separate the channels allows the LIDAR to resolve the ambiguity associated with having multiple pulses of light in the air at the same time. In this manner, the third instance is able to run the LIDAR without ambiguity much faster than other instances.

Other advantages include use of existing fiber-optic components and the fact that no pixel-to-pixel LIDAR timing/ distance errors are observed due to variations in detector-to-detector performance.

The latter, in particular, is an advantage over LIDAR focal plane arrays, wherein detector performance will vary from pixel-to-pixel, which will limit the ultimate timing or distance accuracy.

Figure 7:
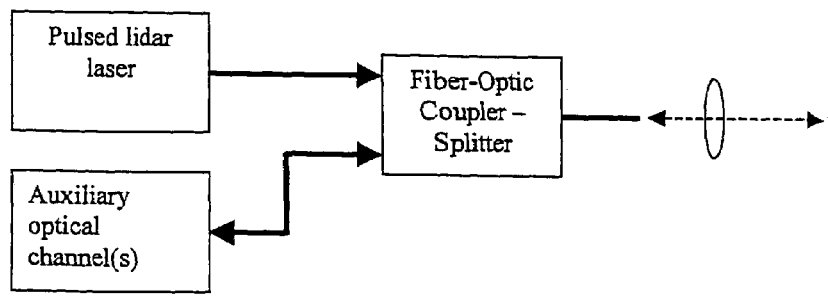
FIG. 7 is a block diagram illustrating the combination of optical beams utilizing a fiber optic coupler-splitter.

With reference to FIG. 7, the ability to combine optical beams with, for example, a fiber optic coupler-splitter, allows one or more diagnostic channel to be coupled either synchronously or asynchronously with the LIDAR path with near perfect optical registration. By sharing the same exit or launch optical fiber, the LIDAR and auxiliary channel(s) stay in optical registration. The auxiliary channel can be any suitable remote, fiber-based optical measurement device including temperature (IR viewing), velocity detection, vibration detection, phased LIDAR, or laser ultrasonic or acoustic non-destructive testing.

Figure 8:
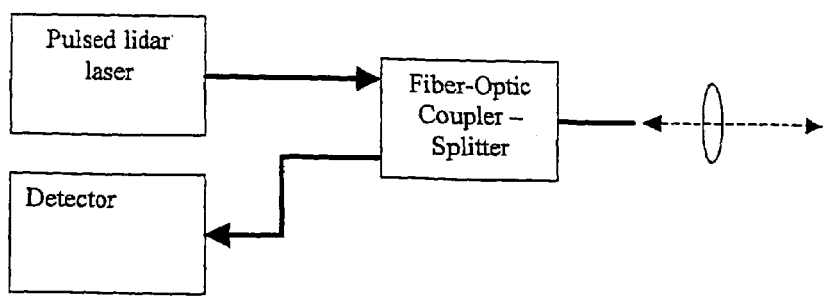
FIG. 8 is a block diagram illustrating the collimation and refocusing of a launched and return laser beam, respectively, utilizing a single lens.

One advantage of fiber optics over conventional macro-optics is that multiple optical signals can be combined and launched down a single fiber at high efficiency. This can be applied with advantage to simplify LIDAR systems, as in exemplified in the FIG. 8 system block diagram. In the FIG. 8 system, laser is launch out of the fiber (preferably singlemode) network and collimated using a lens. The return beam is focused using the same lens and launched back down the same fiber, and rerouted to the detector. The advantages of the FIG. 8 scheme include a minimum number of components and no transmitter-receiver alignment.

In this case, the outgoing and receive beam by sharing the same exit fiber, stay in perfect relative alignment, thus making for a simple and very rugged LIDAR system format.

The foregoing description indicates that there are several ways of resolving divided pulse components based upon the time that the components are received by a detector. For example, as discussed above with respect to the FIG. 2, detectors 222 receive pulse signals for determining spectral characteristics and the pulses received by these detectors 222 are associated with a pulse signal received by the LIDAR detector 214 by a known time delay caused by the delay loop 208. In FIG. 3, a pulse signal for one of three (in the preferred embodiment) wavelengths is delayed by a known time, and so each of the pulse signals can be associated with the others for each pulse emitted by the white laser 302. Similar principles apply in the embodiments shown in FIGS. 4-6, in which known time delays are used to resolve the pulse signals and create a single point per pulse.

Additionally, those skilled in the art will appreciate that attenuators and filters may be included in either the monochromatic or white light path to balance the illumination and ensure laser safety.

Thus, it should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A method of obtaining both location information and spectral information regarding an object, the method comprising:
   generating a laser pulse;
   dividing the laser pulse into a monochromatic laser pulse and a wave-length broadened white laser pulse;
   delaying the wave-length broadened white laser pulse with respect to the monochromatic laser pulse;
   combining the monochromatic laser pulse and the delayed wave-length broadened white laser pulse to provide a combined laser pulse signal;
   directing the combined laser pulse signal to a point on the object and receiving a corresponding return light signal that includes a laser pulse portion and a broadband portion;
   providing the laser pulse portion of the return light signal to optical detector and timing electronics to generate object location information;
   dividing the broadband portion of the return light signal into a number of spectral components;
   providing each of the spectral components to an associated intensity-related measuring/detection circuit triggered by timing signals received from the optical detector and timing electronics to generate corresponding object spectral information such that the object location information and object spectral information regarding the point on the object are extracted simultaneously from the same laser pulse.

2. A method as in claim 1, and further comprising:
   repeating the steps of claim 1 for a plurality of sequentially scanned laser pulses to obtain object location information and object spectral information regarding a plurality of points on the object to create a point cloud database relating to the object.

3. A method as in claim 1, and further comprising:
   coupling a separate secondary illumination light source to the monochromatic laser pulse.

4. A method as in claim 3, and wherein the secondary illumination light source comprises a secondary laser.

5. A method as in claim 3, and wherein the secondary illumination light source comprises a super bright white LED.

6. A method as in claim 3, and further comprising:
   synchronizing sampling of return light from the secondary illumination light source with the generated laser pulse.

7. A system for generating both location information and spectral information for a plurality of points on an object, the system comprising:
   a pulsed laser that generates a sequence of laser pulses;
   a beam splitter that splits each laser pulse into a direct monochromatic laser pulse and a wave-length broadened white laser pulse, the wave-length broadened white laser pulse being time delayed with respect to the direct monochromatic laser pulse;
   a beam combiner that combines the direct monochromatic laser pulse and the time delayed wave-length broadened white laser pulse to provide a combined laser pulse;
   macro-optics that transmits the combined laser pulse to a point on the object and receives a corresponding return signal from the point on the object, the return signal including a received laser pulse signal and a received broadband signal;

a filter that separates the received laser pulse signal and the received broadband signal;

an optical detector connected to the filter to detect the received laser pulse signal and that generates object location-related information and timing signals relating to the received laser pulse signal;

a wavelength separator connected to the filter to divide the received broadband signal into a plurality of spectral components;

for each spectral component, an associated intensity-related detector that is triggered by the timing signals generated by the optical detector to generate object spectral information; and whereby object location-related information and object spectral information are simultaneously generated for each of a plurality of points on the object.

* * * * *